United States Patent
Blood et al.

(10) Patent No.: US 6,456,706 B1
(45) Date of Patent: Sep. 24, 2002

(54) AUTOMATIC TELEPHONE SILENT CALL SCREENING SYSTEM

(76) Inventors: Carolyn S. Blood, 4 Hickory La., Whitehouse Station, NJ (US) 08889; Erwin K. Lohner, 2 Hickory La., Whitehouse Station, NJ (US) 08889

( * ) Notice: Subject to any disclaimer, the term of this patent is extended or adjusted under 35 U.S.C. 154(b) by 0 days.

(21) Appl. No.: 09/643,581

(22) Filed: Aug. 22, 2000

Related U.S. Application Data

(63) Continuation of application No. 08/896,825, filed on Jul. 18, 1997, now abandoned.

(51) Int. Cl.[7] .............................................. H04M 3/42
(52) U.S. Cl. ...................................... 379/188; 379/199
(58) Field of Search ........................... 379/67.1, 88.11, 379/88.12, 88.15, 88.16, 88.19, 88.2, 88.21, 88.22, 88.28, 142, 167, 177, 201, 210, 211, 212, 214, 354, 355, 357, 373, 376, 37, 142.01, 167.01, 201.1, 188, 194, 199, 207.14, 210.02, 210.03, 214.01, 355.02, 373.01, 376.02

(56) References Cited

U.S. PATENT DOCUMENTS

| | | | | |
|---|---|---|---|---|
| 4,488,005 A | * | 12/1984 | Frantz | |
| 4,926,470 A | * | 5/1990 | Sanford | 379/199 |
| 5,033,076 A | * | 7/1991 | Jones et al. | 379/67 |
| 5,195,126 A | * | 3/1993 | Carrier et al. | 379/45 |
| 5,239,570 A | * | 8/1993 | Koster et al. | 379/45 |
| 5,249,223 A | * | 9/1993 | Vanacore | 379/221 |
| 5,283,818 A | * | 2/1994 | Klausner et al. | 379/67 |
| 5,388,150 A | * | 2/1995 | Schneyer et al. | 379/196 |
| 5,444,760 A | * | 8/1995 | Russ | 379/45 |
| 5,448,631 A | * | 9/1995 | Cain | 379/201 |
| 5,467,388 A | * | 11/1995 | Redd, Jr. et al. | 379/196 |
| 5,678,011 A | * | 10/1997 | Kim et al. | 395/202 |
| 5,745,559 A | * | 4/1998 | Weir | 379/199 |
| 5,802,157 A | * | 9/1998 | Clarke et al. | 379/196 |
| 5,930,700 A | * | 7/1999 | Pepper et al. | 379/211 |

* cited by examiner

Primary Examiner—Scott L. Weaver
(74) Attorney, Agent, or Firm—Horst M. Kasper

(57) ABSTRACT

A user programmable telephone call screening device which screens incoming telephone calls by comparing a caller's identifying code to user programed codes and either diverting the call, without ringing the phone, to an answering device or ringing the phone for pickup by the intended recipient. The screening device is automatically deactivated to permit all incoming calls to ring through after an out going 911 or other user defined emergency call is made. The screening device also functions to permit the user to look up and automatically dial a call to phone numbers entered into the screening device's memory by the user. The screening device's programmable CPU and memory permit many functions to be incorporated into the device including, in-coming and out-going call blocking by area code, phone number and time of day, call forwarding, pager notification and recording out-going call information to permit the user to verify calls against telephone company billing records or for other purposes.

21 Claims, 5 Drawing Sheets

AUTOMATIC TELEPHONE SILENT CALL SCREENING SYSTEM

This application is a continuation application of Ser. No. 08/896,825 filed Jul. 16, 1999, now abandoned.

FILED OF THE INVENTION

This invention relates to telephone answering and screening systems which provide for control over the reception of incoming telephone calls.

BACKGROUND OF THE INVENTION

In general, individuals go to great lengths to protect their home and its environment. This is accomplished via different means—(SECURITY SYSTEMS, FIRE AND SMOKE DETECTORS, LOCKS) and in some cases unpublished phone numbers. At the present time certain Governmental agencies are reviewing the passage of laws to prevent electronic home intrusion via telephone lines. In the recent past the Boston Herald reported that an opt out law is being considered that would permit Massachusetts consumers to place their names on a list that telemarketers would be required to honor. If adopted such a law would prevent unwanted calls from these sources. The opt out list would be administered by the Massachusetts secretary of state office. Action of this nature clearly indicates that a screening device to control telephone access to one's home can fill an significant need of the general public to insulate themselves from unwanted and intrusive telephone contact.

The need for this type of device to permit individuals to protect their homes from intrusions via telephone lines and prevent unsolicited calls or access to those attempting to commit fraud have been on numerous major television network documentaries and news programs. Recent examples include:

1. Calls preying upon the elderly and inducing them to invest or spend money to receive services or awards that are bogus.
2. Calls soliciting credit card numbers over the phone. The call recipients are told that their account has been frequently charged recently. They are told that if they deny these charges and give the caller their account number they will not be held liable for these charges. This scam often succeeds in obtaining the individuals account number.

At the preset time the general public is almost defenseless and has few if any viable options to deflect these and other bothersome calls including prank and obscene phone calls and at the same time provide access to desired callers and legitimate services or professional organizations.

There are a variety of devices which have been proposed for collecting, interpreting and processing incoming telephone calls to provide for caller identification, call screening and blocking of unwanted telephone calls. One such device is described in U.S. Pat. No. 4,266,098 which was issued on May 5, 1981 to Novak There are features such as a display of the name of a party related to the identity of the incoming caller described in U.S. Pat. No. 4,924,496 which was issued May 8, 1990 to Figa, et al. The system such as that described in U.S. Pat. No. 5,524,140 issued on Jun. 4, 1996 to Klausner, et al., which describes a telephone answering device which organizes voice messages and personal identifications. And U.S. Pat. No. 5,526,406 issued on Jun. 11, 1996 to Lineau which provides the identity of the caller in a synthesized human voice as another alternative screening device. In addition, a patent application filed in the United Kingdom, No. GB 2 260 0670 A, filed Oct. 18, 1991 by Norm Pacific Automation Corporation describe speech recognition technology to identify callers to screen incoming telephone calls. In addition to these devices, certain preferred caller identification apparatus have been described in U.S. Pat. No. 5,029,196 issued on Jul. 2, 1991 to Morgenstein which describes an external telecommunication switching system for screening telephone calls and devices such as that described in U.S. Pat. No. 5,276,731 issued Jan. 4, 1994 to Ralabel, et al., which describes an apparatus for handling incoming telephone calls for delivering predetermined messages and screening as well as U.S. Pat. No. 5,408,528 issued on Apr. 18, 1985 to Carlson, et al., which describes a method of screening and rejecting telephone calls. While all of these various devices have certain desirable features and utility they have serious limitations in their ability to pass through urgent and other highly desirable calls that may otherwise be diverted or blocked by the various devices described above. For example, if the user of one of tie above systems placed a 911 emergency call and hung up terminating the call before the caller was able to communicate with the recipient of the 911 call, the callback, which could be of substantial importance to the caller, would be blocked by the above described systems. There are also no provisions in any of the prior art devices for temporarily disabling of the screening function to allow a particular call to ring through. In addition, none of the systems above provide the ability to utilize distinctive ringing to distinguish between various calls that the recipient may want to receive but divert to an answering machine. Nor do they provide the use of a distinctive ring to distinguish between various incoming calls to alert the recipient to the prospective caller without having to physically view the call screening apparatus.

OBJECTS OF THE PRESENT INVENTION

It is an object of the present invention to provide an telephone screening device which is automatically disabled with regard to screening of incoming calls for period of time subsequent to the transmission of an outgoing 911 call.

It is an additional object of the present invention to provide for user reactivation after a 911 call deactivation.

It is also an object of the present invention to provide for call screening independent of telephone company caller identification signals.

It is an additional object of the present invention to provide for screening of unwanted calls without the users phone ringing.

It is a further object of the present invention to provide for the user to program not only screening capabilities but distinctive rings based on certain input information that the recipient can program into the screening device.

It is a further object of the present invention to provide for an economical system which makes use of standard telephone equipment including telephone handsets and answering machines which may already be owned by the user. It is also an object of the present invention to provide incoming callers who have an identification number to place a call and have it ring through to the recipient irrespective of where they are calling from by inputting a code number that is known to the recipient.

It is a further object of the present invention to permit access to the bank or credit card company of the owner of the screening device by allowing the use of a portion of the owner's account number or social security number to function as an owner selected identification number.

It is also an object of this invention to provide for temporarily disabling of the screening device to permit a particular caller to ring through on one or more occasions and thereafter screen such calls.

Additional objects and features of the within invention are further set forth in this application in the accompanying specification drawings and claims.

DESCRIPTION OF THE PREFERRED EMBODIMENT

Figure 1:
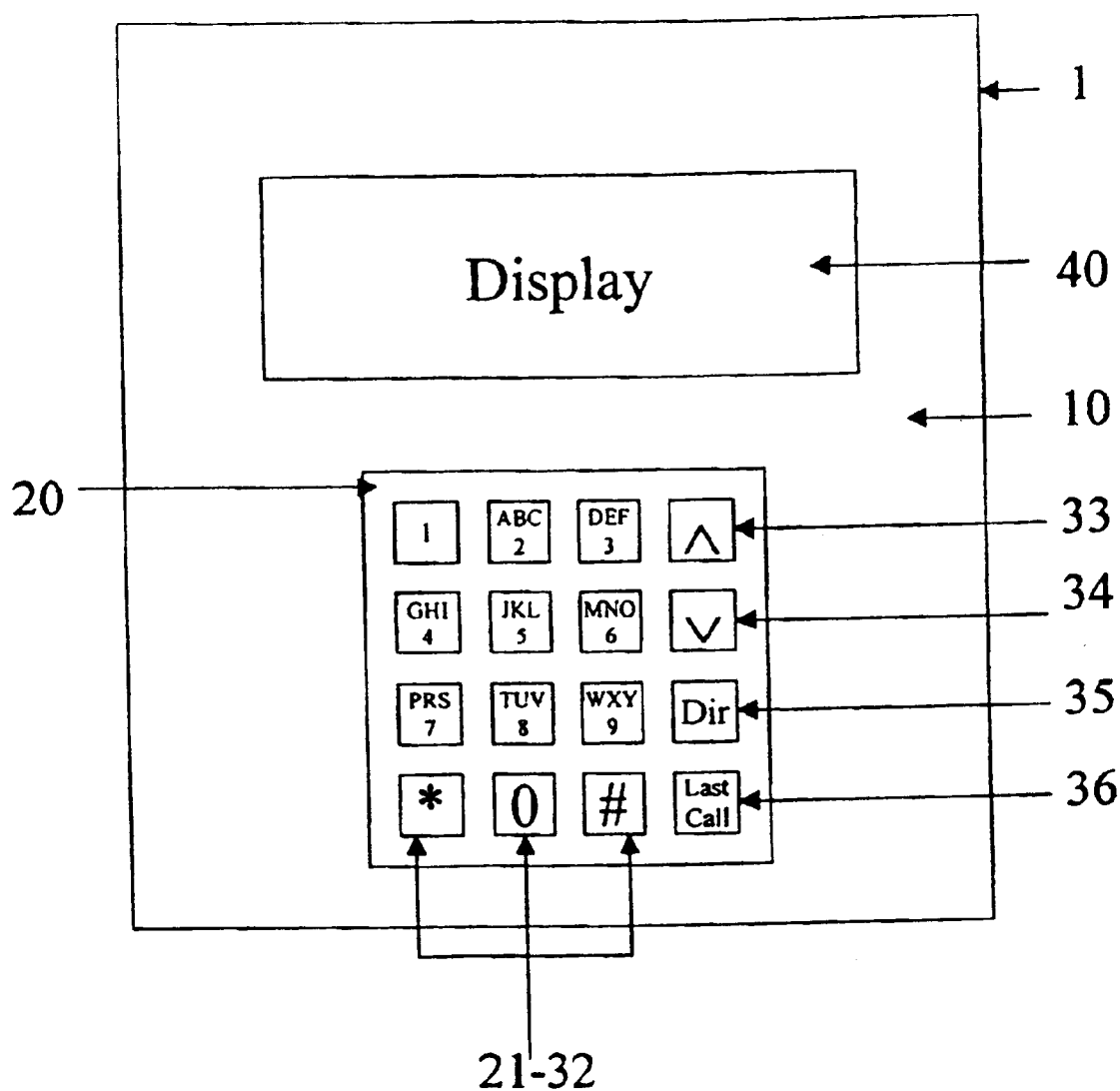
FIG. 1. illustrates the face panel of the preferred embodiment of the invention.

FIG. 1: FIG. 1, which depicts face panel 10 of screening device 1, further depicts keypad 20 which contains standard telephone keys 21 through 32, scroll keys 33 and 34 as well as directory key 35 and last call key 36 which are used as described below to use and program screening device 1.

FIG. 1 also depicts display panel 40 which is used with keypad 20 to view messages and program screening device 1.

Figure 2:
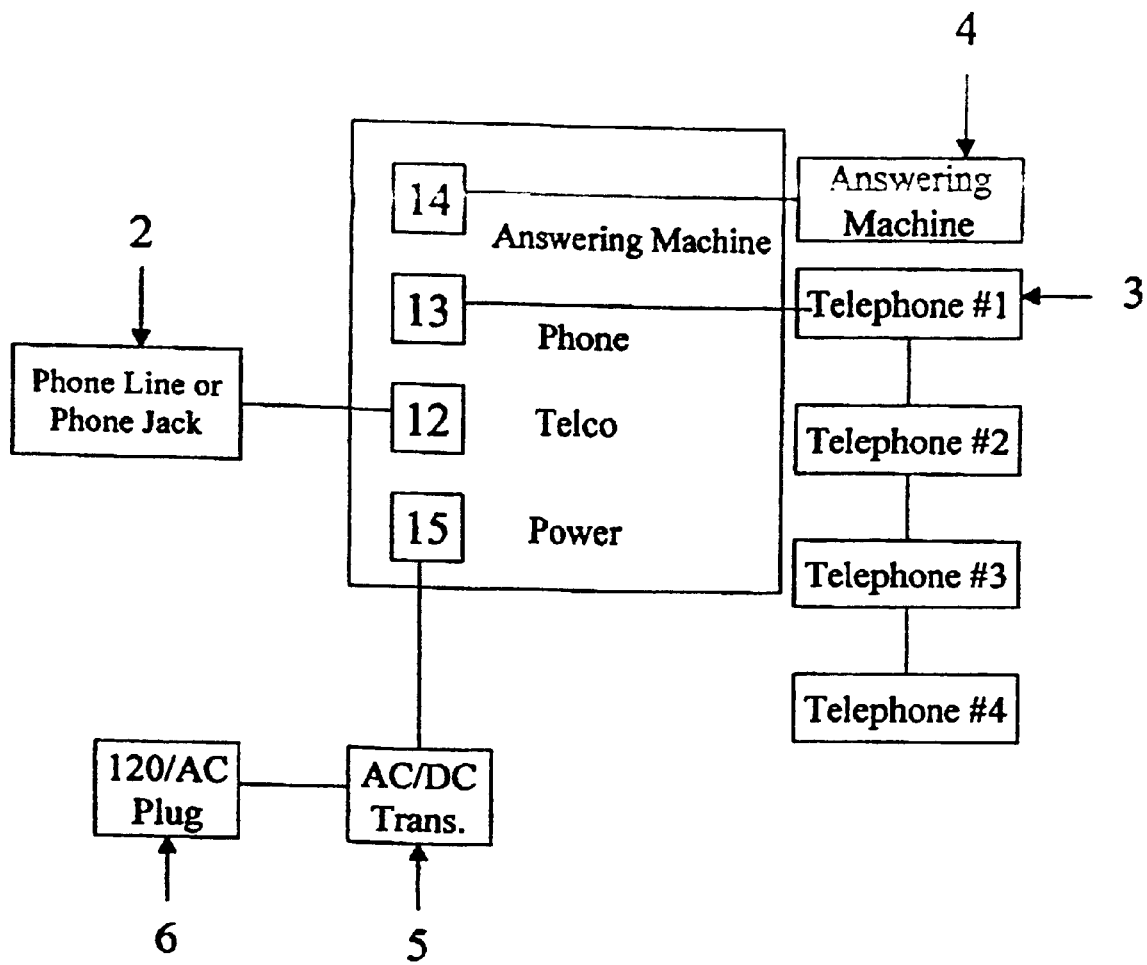
FIG. 2. illustrates the connections to the invention.

FIG. 2: As shown in FIG. 2, screening device 1 is: installed to control either a single phone or multiple phones on one phone line in the home. In the preferred embodiment up to four phones can be connected however additional phones are also contemplated with the number being limited only by the available power to activate the ringers in the individual phones. Screening device 1 connects to standard modular plug 2, such as a standard telephone wall jack, through Telco line plug 12. Telephone 3 is connected to screening device 1 through modular plug 13. Screening device 1 can be connected to the first access point in the owner's premises if all phones are to be serviced by screening device 1. Answering machine 4 is connected to screening device 1 through modular plug 14. In the preferred embodiment answering machine 4 is a standard answering machine which is used to receive messages from unauthorized callers or for authorized callers to leave messages when the owner is unable to answer telephone 3. In the preferred embodiment power is supplied from 120 volt ac outlet 6 through ac/dc transformer 5 to plug 15 in screening device 1, although any conventional source of power is suitable.

Connections between screening device 1, telephone 3 and answering machine 4 are made via standard modular phone jacks and cords.

Figure 3:
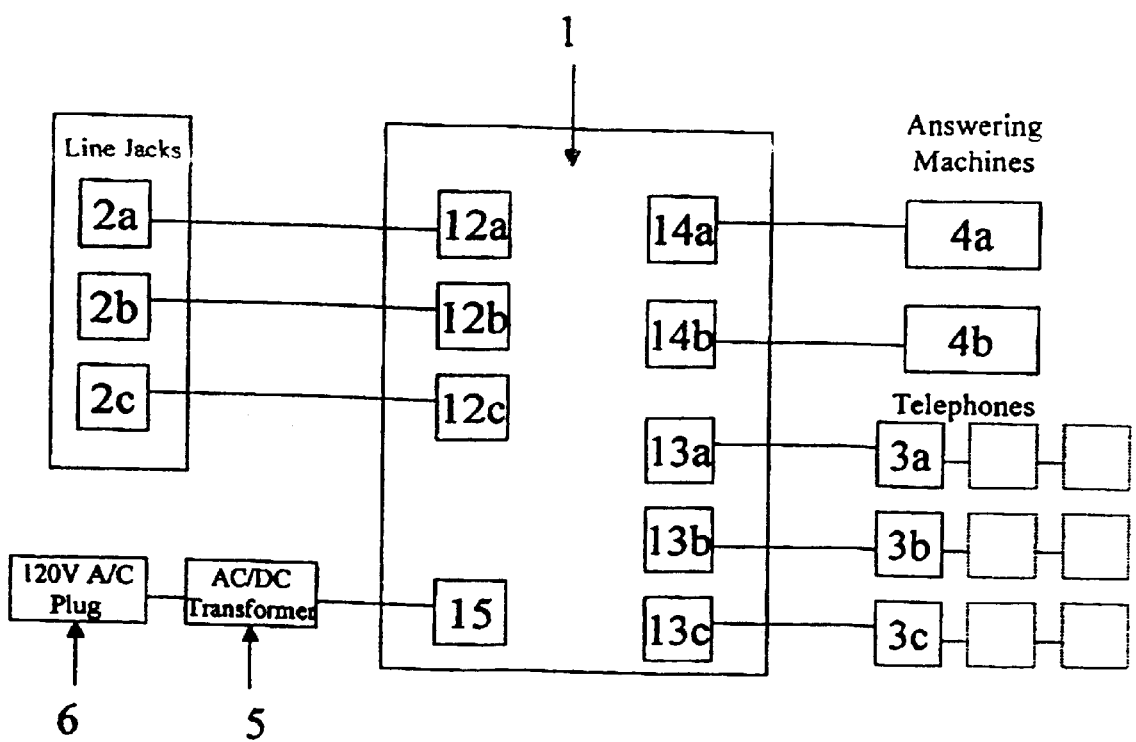
FIG. 3. illustrates a multi-line screening device.

FIG. 3: FIG. 3 depicts an alternative embodiment of screening device 1 that can handle two or more-incoming phone lines and provide for multiple sets of screened telephones. Line jacks 2a, 2b and 2c, representing incoming telephone lines, are connected to the telco connections on screening device 1 through telco jacks 12a, 12b and 12c to provide input to screening device 1 from multiple telephone lines. Screening device 1 is connected through answering machine jack 14a co answering machine 4a and a second answering machine jack 14b provides a connection to answering machines 4b. The use of answering machines 4a and 4b permit two messages to be recorded simultaneously. Additional answering machines may be utilized if found to be desirable when more than two incoming lines will be screened. Power is supplied to screening device 1 from your standard 120 volt AC plug 6 which supplies power to AC-DC transformer 5 which in turn is connected to screening device 1 through power plug 15. Output from screening device 1 is directed through telephone jacks 13a, 13b and 13c to telephones 3a, 3b and 3c. Each of these lines can service several telephones, the normal maximum being approximately 4 telephones, depending upon the power requirement for the ringers in each of said telephones.

Figure 4:
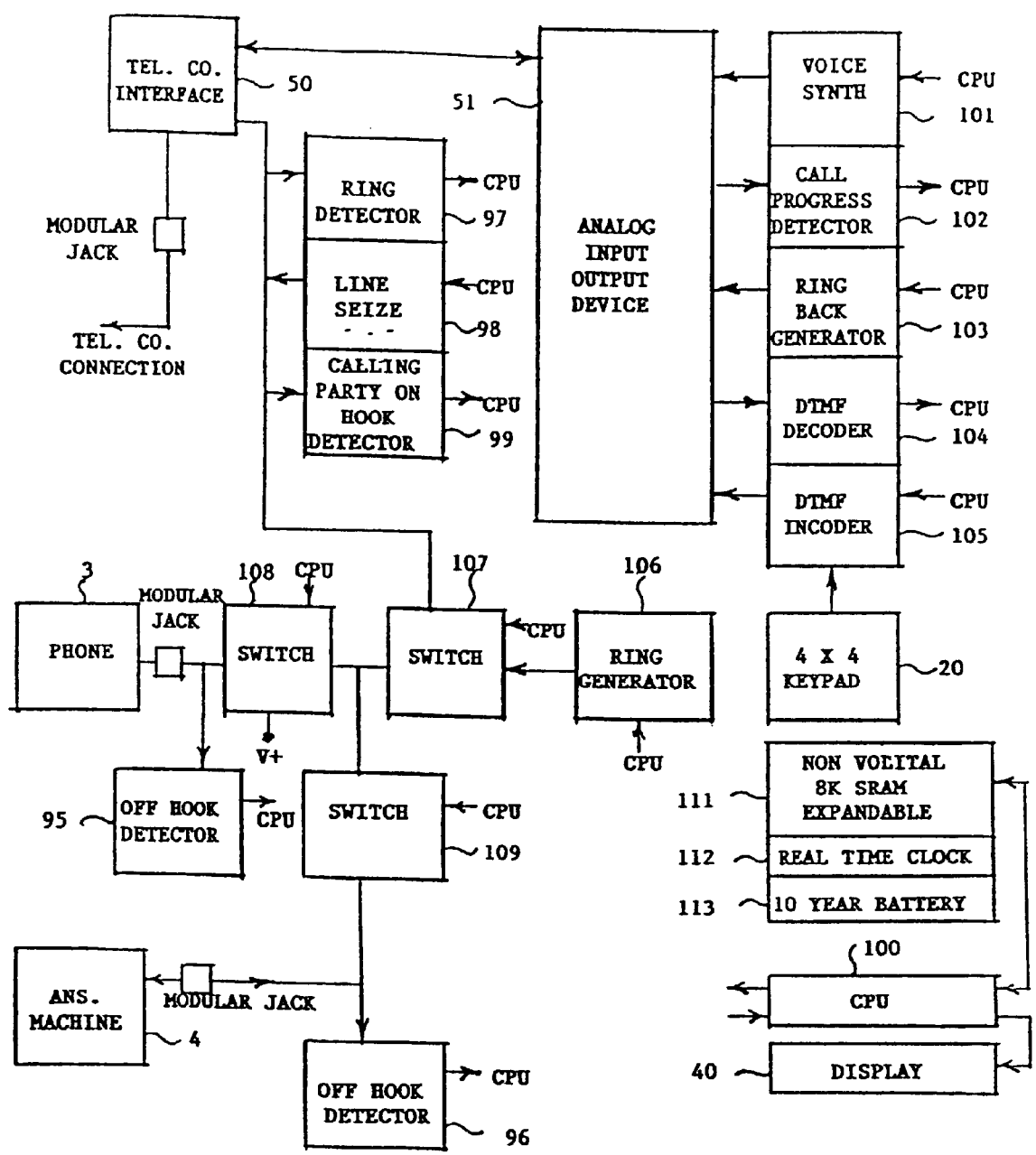
FIG. 4. depicts a schematic of the invention's major functional components.

FIG. 4: FIG. 4 depicts the major components of the preferred embodiment of screening device 1.

In FIG. 4 CPU 100, which is a pre-programmed microprocessor, controls the various functions and features described in the specification. CPU 100 is programmed to provide the basic functionality described in the specification for disabling incoming calls screening upon a dialing of 911 outgoing call and for any and all of the various features described below in this specification. Inputs from the user are entered through keypad 20 and input is monitored on display panel 40. Inputs are stored in non-volatile memory 111 and system time and date are regulated by clock 112. Battery 113 maintains the contents of non-volatile memory 111 and system time and date.

Telephone company interface 50 and analog input/output interface 51 provide the interfaces between screening device 1 and the telephone company phone line.

The preferred embodiment functions as follows:

When an incoming call is detected by RING DETECTOR (97) CPU (100) activates LINE SEIZE DEVICE (98) which seizes the incoming line, i.e. the equivalent of picking up the phone. CPU (100) activates VOICE SYNTHESIZER (101) which plays the pre-recorded greeting which is transmitted via ANALOG INPUT/OUTPUT DEVICE (51) and TELEPHONE COMPANY INTERFACE (50) to the calling party. The calling party is prompted in the greeting to enter a 4 digit identification code. As the caller enters his or her identification code the identification code is decoded by DTMF DECODER (104) and sent to CPU (100). CPU (100) then compares the identification code entered by the caller to those found in Non-Volatile Memory (111).

If the caller enters an invalid identification code or does not enter any code CPU (100) activates SWITCH (107), SWITCH (109) and RING GENERATOR (106) which rings ANSWERING MACHINE (4). CPU (100) now initiates the ring back to the caller by activating RING BACK GENERATOR (103). When the ANSWERING MACHINE (4) answers the ring it is detected by OFF HOOK DETECTOR (96). CPU (100) then deactivates RING GENERATOR (106) and switches SWITCH (107) to the incoming outside line. A connection from the calling party to answering machine 4 is now enabled and the caller can now leave a message on answering machine 4. When the calling party hangs up the phone the hang up is detected by CPU (100) through CALLING PARTY ON HOOK DETECTOR (99). CPU (100) then deactivates SWITCH (109).

If the caller enters a valid identification code the data stored in NON-VOLATILE MEMORY (111) assigned to that identification code is loaded and temporally stored in data registers in CPU (100). The correct time is loaded from REAL TIME CLOCK (112) and temporarily stored in data registers in CPU (100). The data that is stored in said data registers is now transferred to DISPLAY (40). Display 40 then exhibits the caller's area code, phone number, ring code, name, date and time. The data which is stored temporarily stored in CPU 100's data registers is also stored in the NON-VOLATILE MEMORY (111) in a separate section reserved for incoming call logs. CPU (100) now activates SWITCH (107), SWITCH (108) and RING GENERATOR (106) which rings PHONE (3). CPU (100) now initiates the ring back to the caller by activating RING BACK GENERATOR (103). When the called party answers PHONE (3), this state is detected by OFF:HOOK DETECTOR (95). CPU (100) then deactivates SWITCH (107) turns off RING GENERATOR (106). LINE SEIZE (98) is now deactivated and a normal connection exists between the calling party and the called party. When either party hang up the hang up will be detected by CALLING PARTY ON HOOK DETECTOR (99) or OFF HOOK DETECTOR (95). When either of these conditions is detected screening device 1 will reset and return to its idle condition.

CPU (100) is programed to recognize a 911 call. When phone 3 goes off hook OFF HOOK DETECTOR (95) signals CPU (100) to activate DTMF DECODER (104). When 911 is dialed the signal from DTMF DECODER (104) shuts down CPU (100) and PHONE (3) is connected directly to TELEPHONE LINE (2). All incoming telephone calls ring PHONE (3) and all screening functions are disabled. In the preferred embodiment SCREENING DEVICE (1) must be powered down after a 911 call is made to re-establish the screening functions.

Phone numbers can be auto dialed from either the valid callers directory or the recent calls directory. The user selects either director by pressing Directory Key 35 or last call Key 36 on Keypad 20. The user can then use scroll up arrow 33 or scroll down arrow 34 to advance or decrement CPU (100) through the contents of non-VOLATILE memory (111). When the person you wish to call is displayed on DISPLAY (40) lift the handset on PHONE (3). When this state is detected by OFF HOOK DETECTOR (95) CPU (100) activates SWITCH (108) and sends the phone number data to DTMF ENCODER (105) which dials the phone number to initiate the call. When the user hangs up the phone the hang up is detected by OFF HOOK DETECTOR (95). When this condition is detected CPU (100) will reset and return screening device 1 to the idle condition.

If the phone number dialed by the user is busy, inputting *56 via keypad 20 will initiate re-dials of the phone number until a connection is made. Once the *56 re-dial is activated CPU (100) will wait 60 seconds then activate LINE SEIZE (98),activate DTMF ENCODER (105) and re-dial the phone number. CALL PRCGREESS DETECTOR (102) monitors the phone line and sends CPU (100) information regarding the status of the phone call. If the status of the call is busy CPU (100) will deactivate LINE SEIZE (98) and repeat the previous steps until the line is no longer busy or an incoming or outgoing call is detected.

Once CALL PROGRESS DETECTOR (102) detects a ring condition on the phone line, CPU (100) monitors CALL PROGRESS DETECTOR (102) which monitors the line through INPUT/OUTPUT DEVICE (51) and waits for an answer condition. Once a answer condition is detected, CPU (100) activates VOICE SYNTHESIZER (101) which plays pre-programed greeting "please hold for an incoming call)". CPU (100) then activates SWITCH (107), SWITCH (108) and RING GENERATOR (106) which rings PHONE (3). When PHONE (3) is answered picking up the receiver is detected by OFF HOOK DETECTOR (95). CPU (100) then deactivates SWITCH (107), RING GENERATOR (106) and LINE SEIZE (98). At this time a normal connection exists between then calling and called party.

When either party hangs up the hang up is detected by CALLING PARTY ON HOOK DETECTOR (99) or OFF HOOK DETECTOR (95). When either condition is detected CPU (100) resets screening device 1 to its idle condition.

Figure 5:
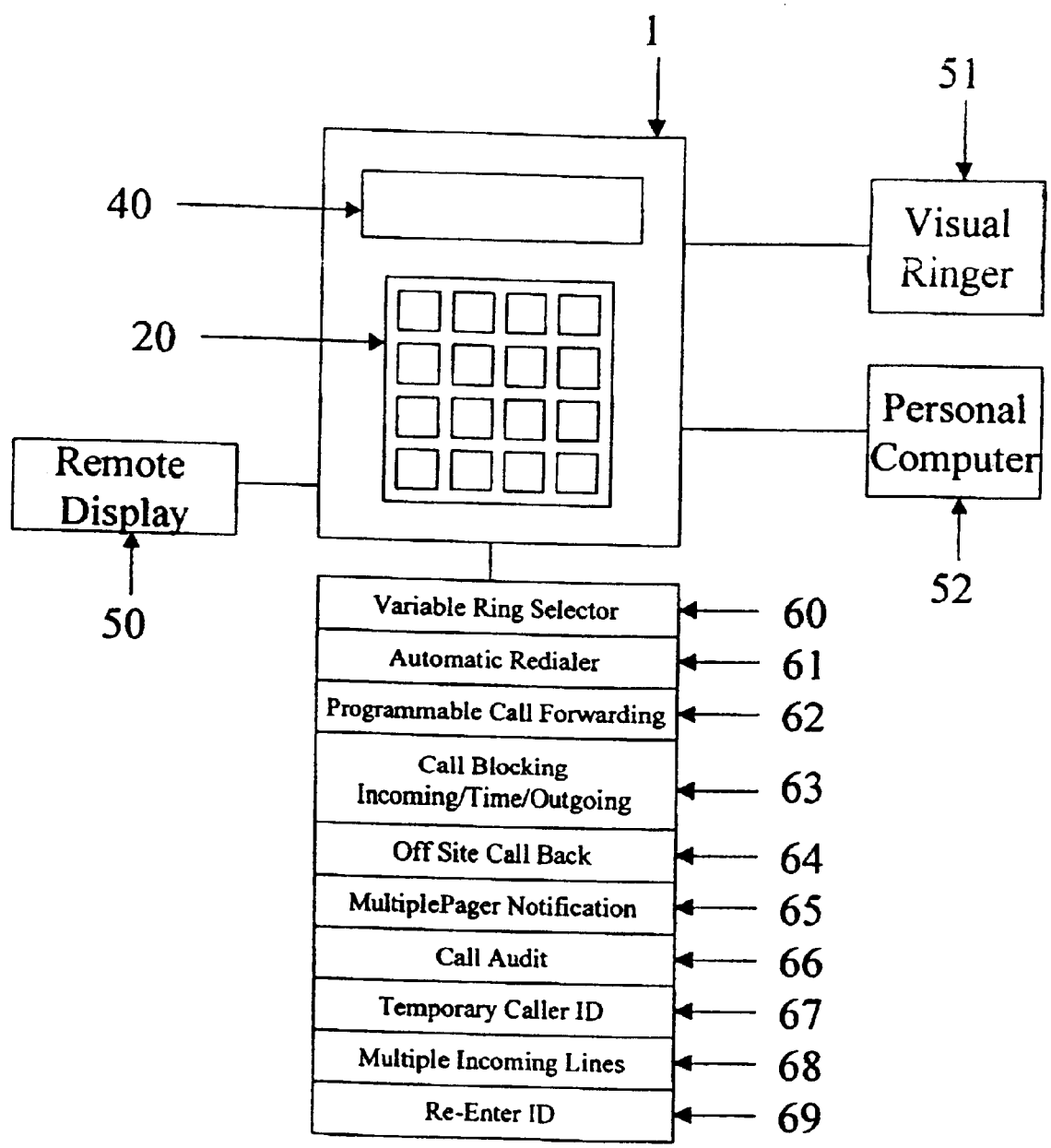
FIG. 5. represents a block diagram of optional features of the invention.

FIG. 5: FIG. 5 represents a schematic diagram of screening device 1 illustrating display panel 40 and keypad 20 and ADDITIONAL FEATURES and interconnections. The following lists set forth the features of the preferred embodiment and a list of ADDITIONAL FEATURES.

LIST OF FEATURES OF THE PREFERRED EMBODIMENT

Call screening
911 Call deactivation
128 Caller ID capability (expandable)
Last call scan (128 call wrap around—expandable)
Memory scroll (128 names and numbers—expandable)
Connection to answering machine
Available IDs=10,000 (expandable)
Auto Dial from Last Call scan and Memory scroll lists

LIST OF ADDITIONAL FEATURES

50—Remote Display
51—Visual Ringer alternative notification for hearing impaired
52—RS-232 computer interface
53—PC card configuration
60—Variable Ring Selector multiple ring cadence (expandable) for convenience and visually impaired
61—Auto dial retry
62—Programmable Call Forwarding (requires at least two lines)
63—Call Blocking including incoming/outgoing and time blocking
64—Off site Call Back
65—Multiple Pager Notification
66—Call Audit (outgoing call listing including area code, number, date, time and duration)
67—Temporary Caller ID assignment
68—Multiple Incoming Lines for simultaneous incoming call capability
69—Re-Enter ID (caller input multiple retrys)

DESCRIPTION OF ADDITIONAL FEATURES

FIG. 5 illustrates the use of Remote Display 50 which provides the same output that is normally displayed on display panel 40 at Screening Device 1 through the standard telephone line at a remote telephone connected to Screening device 1. Remote Display 50 can display the identification information including the caller, name, phone number etc. as normally displayed on Display Panel 40.

FIG. 5 also illustrates Visual Ringer 51 which provides for a strobe or other bright flashing light to indicate to a hearing impaired individual their call is coming in through screening device 1.

Screening Device 1 can also be connected by a communicating means such as an RS-232 serial connection to Personal Computer 52. Software to provide the ability for Personal Computer 52 to communicate with screening device 1 can be readily accomplished by one skilled in the art to permit Personal Computer 52 to provide additional memory capacity programming and as an alternative to programming screening device 1 through keypad 20. In addition Personal Computer 52 can function as the answering machine using conventional voice messaging systems, the display and, if connected to a printing device, permit printouts of names, phone numbers, call audit data and all other information in the screening device's memory.

Screening Device 1 can also be produced for direct installation into a personal computer or other electronic device capable of supporting a voice messaging system in the form of PC Card 53. PC Card 53, in the preferred embodiment, incorporates the components and functionality described in FIG. 4 and can support all of the features included in the preferred embodiment as well as the ADDITIONAL FEATURES described in this specification. Other configurations such as those set forth herein for Screening Device 1 are also contemplated.

In addition various other ADDITIONAL FEATURES that can be programmed into screening device 1 are listed including the following:

Variable Ring Selector 60 which provides for selection of different ring cadences which can be programmed for various ID caller identification codes to ring differently for calls to parents distinguishing them from calls to children that will ring through screening device 1.

Automatic Re-Dialer 61 will automatically re-dial outgoing calls if the line is busy.

Programmable Call Forwarding 62 allows calls to be forwarded from screening device 1 to outside lines. This function can be accessed by calling into the system from the outside.

Call blocking 63 which can block outgoing calls to various calls to various numbers by time to restrict children from calling friends for instance after 10 p.m. and can also block incoming calls at certain times to prevent the children's friends for example from calling in after 10 p.m. Such incoming calls would be deferred to answering machine or would encounter a busy signal.

Off Site Call Back 64 as described below in Feature 64.

Multiple Pager Notification 65 which can be used to activate a call to one or more pagers if an incoming call from a previously selected caller is received by screening device 1.

Temporary caller ID is described in Feature 66 below.

Multiple Incoming Line feature 68 provides for two or more lines to be handled by Screening Device 1 to run through to various phones and to provide message reception on one or more answering machines.

Re-Enter ID 69 permits callers who make an error in dialing their input codes to re-enter their codes.

It is contemplated that these optional features are readily programmed into screening device 1 and are contemplated as part of this invention as optional features.

DETAILED DESCRIPTION OF SELECTED ADDITIONAL FEATURES

Feature 61

Auto Dial Retry

This feature is different from Auto Dial. It is timed auto dial retry that will re-dial at a pre-defined interval. This feature is activated by depressing *56 if a busy signal is encountered when attempting to complete the connection to the called party.

Feature 62

Call forwarding

This feature provides the capability to have phone calls forwarded to another location. Example: You are going to a friend's house but you are expecting a call. You could program the screener to forward the call to your friend's telephone. This could be done for a particular calling individual or for all incoming calls. This feature requires two or more telephone lines. This feature can be activated either through Keypad 20 locally or remotely via an off-site phone.

Feature 63

Call Blocking

This feature denies access to any number you do want dialed from your home. You can block any 900 or other numbers. You can also override this access by the use of your own private ID number. The use of this ID number will allow the blocked phone numbers to be dialed only by the individuals who know the ID number. You control the assignment of the ID number. This feature can also be activated by time of day to permit blocking of incoming and outgoing calls by time of day, phone number and area code.

Feature 64

Off Site Call Back

This feature allows the user to call screening device I and upon entering a correct ID number and two telephone numbers screening device 1 will activate the call back feature. It will call you back at the telephone number you entered (your location) and call the number you input for the called party. This feature allows you to make calls remotely. It has many billing advantages (utilize home calling plans and reduce pay phone charges). This feature requires an ID number and two or more telephone lines.

Feature 66

Call Audit

This feature allows you to review the calls dialed memory file.

These are the calls that have been dialed by phones protected by screening device 1. screening device 1 has a maximum of (64) numbers that may be reviewed. Additional numbers can be reviewed by adding more memory to the system. This feature is useful when the need to compare calls billed to dialed exists.

Feature 67

Temporary ID Assignment

This feature gives the user of the Screening Device 1 the ability to assign a temporary password to a known or unknown caller. Entering *11 at the waiting for call prompt will activate this feature. Once activated the Silent Screener will accept the pin (9999). A caller not listed in the Silent Screener can now gain access to the screened phone by pressing (9999) at the prompt on the phone keyboard. Once this password is used it will be deactivated in the Silent Screener.

Feature 68

Multiple Incoming Line Capability

This feature provides for two or more incoming calls to be screened simultaneously.

Feature 69

Re-Enter ID

This feature permits a caller to re-enter their ID code if they make an error in entering their code.

USING THE SCREENING DEVICE

Screening device 1 is used in the following manner. The owner assigns a four digit caller ID password to individuals they desire to have ring telephone 3. Up to 128 caller ID passwords can be assigned in the preferred embodiment. However larger numbers of passwords are contemplated and are limited only by the amount of non-volatile memory accessible by the screening device. The owner can also input the caller's name, phone number and ring code through keypad 20 so that when the phone rings the individual caller's name, phone number and ring code will be displayed on display panel 40. In addition, in the preferred embodiment display panel 40 also displays the time and date of the call.

Screening device 1 will automatically answer the incoming call and provide a message such as (Leave message at tone or enter ID now). If a valid ID is entered screening device 1 will display on display panel 40 the caller's number, name and ring code and ring phone 3. (Multiple ring cadences are provided as set forth below.) In the preferred embodiment display 40 can exhibit all of the information programed into screening device 1 related to a particular ID number as well as time, date and other information such as call duration. If an invalid ID is entered the call is transferred to standard user provided answering machine 4. Answering machine 4 is used to provide the following capabilities:

a. Allow unprogrammed callers to leave a message for owner review and b. Allow callers with a valid ID number to leave a message when the owner is not at home or unable to answer the phone.

As shown in FIG. 1 the face panel 10 of device 1 consists of the following:

Display Panel 40, which displays the calling party's name, ID number, date and time. Display panel 40 is also used for owner programming which is described below under the heading ACTIVATION AND PROGRAMING.

Touch Pad 20, which incorporates a standard touch tone telephone key pad which includes keys 21 through 32 plus additional function keys 33 through 36 is used for programming screening device 1 for caller access and other functions described below.

Additional function keys 33 through 36 include Last Call Key 36. In the preferred embodiment depression of this button will display last caller's phone number, name, date and time and place Screening Device 1 into last call mode.

Scroll Up Key (t) 33 and Scroll Down Key ( ) 34 are used to step through the call memory when Last Call Key 36 is activated. After initiation of scanning the call memory utilizing Last Call Key 36 the scan direction can be reversed or continued by sequential depression of Scroll Up Key 33 and or Scroll Down Key 34. Such use of Up Key 33 and Down Key 34 allows the user to scan the previously received calls in either order.

Directory Key (DIR) 35 allows the user to access and scroll through the entire list of caller ID's that the owner has programmed into memory. This scan, in the preferred embodiment, is in alphabetical order. Other orders such as numerical by ID number are also contemplated. The use of Directory Key 35 allows a user to scan the memory to acquire an individual's name and phone number that has been previously programmed into Screening Device 1. Scroll Up Key 33 and Scroll Down Key 34 are also used to scroll through the caller ID memory in the same manner that they are used to scroll through the call memory.

ACTIVATION AND PROGRAMING

Screening device 1 is installed to control either a single or all phone lines in the house. Screening device 1 connects to a standard modular plug and is user friendly with respect to use and owners programming. The owner assigns a CALLER ID PASSWORD to individuals they desire to have ring their phone. The owner can also program the callers name and phone number so that when the phone rings the callers name and phone number will be displayed on display panel 40.

All system programming requires a 4 digit access code. Screening Device 1 consists of two main directories maintained in Non-Volatile Memory 111. They are as follows:

MAIN DIRECTORY

128 NAMES AND NUMBERS WITH RING CADENCE.

NUMBERS ARE SCROLLED IN ALPHABETICAL ORDER

LAST CALL DIRECTORY

128 NAMES AND NUMBERS WITH RING CADENCE.

DATE AND TIME OF CALL. SCROLLED IN CHRONOLOGICAL ORDER WITH WRAP AROUND MEMORY.

Any name and number displayed on display 40 of screening device 1 after activating either Last Call Key 36 or Directory Key 35 will be automatically dialed when the phone goes off hook, that is when the phone handset is picked up off the phone.

If 911 is dialed screening device 1 is disabled and will ring the phone on all incoming calls. Screening device 1 must be powered down after dialing a 911 call to return to normal call screening operation. Other methods of reactivating call screening such as entry of a code or automatic resumption after a time delay are also contemplated.

An incoming call is greeted by message "LEAVE MESSAGE AT TONE (for an answering machine) OR ENTER ID PASSWORD NOW." The entering of a valid four digit CALLER ID PASSWORD will ring the phone for about 30 seconds and if the phone is not answered the calling party will be transferred to answering machine 4. At this time a normal recorded answering machine message can be left and screening device 1 will hang up.

Any valid CALLER ID PASSWORD will search memory and display callers name (up to 17 characters), phone number, ring cadence number, date and time on display panel 40.

| | |
|---|---|
| 908-555-1212 | *2*?????06/14 |
| CAROLYN S. BLOOD | 12:15P |

This information will be stored in the last call directory (128 calls wrap around) memory. The last call may be scrolled at any time.

An invalid or no CALLER ID PASSWORD at the end of the greeting message directs the call to answering machine 4.

If the phone goes off hook any time during the answer machine operation the phone is connected to the line and central office (incoming call).

Screening Device 1 features a non-volatile memory and a real time clock backed up by a ten year embedded battery.

Installation

The following section describes the installation of the preferred embodiment of SCREENING DEVICE 1. Installation requires the use the use of the following items:

SCREENING DEVICE 1
RJ11 (Standard) Phone Cord
Power Adapter
Phone Jack (Standard)

SINGLE PHONE INSTALLATION

The first step to installing screening device 1 is to locate a phone jack to connect screening device 1 to.

Plug one end of the phone cord into the phone jack. Plug the other end of the phone cord into the connector labeled TELCO. on the back of screening device 1. Connect your telephone to the connector labeled PHONE in the same manner. If you wish to use a answering machine you can make this connection to the connector label ANS. Plug the power adapter into the power jack and into a standard wall outlet.

Connecting Additional Phones

Screening device 1 is capable of simultaneously ringing four telephone devices which have a ringer equivalency number (ren) of 1.0. The additional phones are connected in the customary parallel sequence to the phone jack at the rear of screening device 1.

Programming Screening Device 1

In the preferred embodiment programming of any function requires the use of a four digit access code. However, other forms of access codes or no access code are contemplated by this invention. The access code is affixed on the bottom of screening device 1 box via a peel off label for safe keeping.

When power is applied to screening device 1 for the first time the display panel 40 will read: "WAITING FOR CALL"

IDLE DISPLAY DEPICTED

WAITING FOR CALL
05:20 Jul. 3, 1997

Once you have the "WAITING FOR CALL" message on display panel 40 asterisk (*) key 21 on keypad 20. Now enter your access code. While entering your access code the "WAITING FOR CALL" message will remain on display panel 40. When your access code is entered the following message will be displayed:

| SET TIME/DATE | PRESS 1 |
|---|---|
| TIME/DATE OK | PRESS 2 |

If this message is not on display panel 40 check your access code and repeat this step.

SETTING THE TIME AND DATE

Pressing the one (1) key on the key-pad will put you in the set time mode and display the following message on display panel 40:
ENTER YEAR EXAMPLE—1997
IF CORRECT # RE-ENTER Enter the year using the key-pad. While entering the year each number you enter will he displayed on the display panel 40. If you make a mistake entering the year press the (#) key on the key-pad and re-enter the year. Once the correct year is displayed on the display panel 40 press the (*) key.

The following message will be displayed:
ENTER DATE EXAMPLE 04/14
IF CORRECT # RE-ENTER At this time enter in the date. The date is entered as four consecutive digits. The date April 14 is entered as 0414 (04 representing the month April and 14 represent the 14th day). If you make a mistake entering the date press the (#) key the display panel 40. If you make a mistake entering the date press the (#) key on the key-pad and re-enter the date. Once the correct date is displayed on display panel 40 you can continue to the next step by pressing (*) key.

The following message is displayed:
ENTER TIME EXAMPLE 09:23
*IF CORRECT # RE-ENTER The time can now be entered much like you entered the year and the date. Enter four consecutive digits representing the time. The time 9:23 is entered as 0923 (09 representing the hour and 23 representing 23 minutes). Press the (*) key and the following message will be displayed:
PRESS 1 FOR AM, 2 FOR PM The final step in setting the time and date is to set the AM or PM. section of the clock. Pressing one (1) will set the clock to AM, pressing two (2) will set the clock to PM. Once one or two is pressed on the keyboard the time and date will be saved and the "WAITING FOR CALL" display panel 40 will display the new date and time.

PROGRAMMING FOR FIRST TIME USE

Before using screening device 1 for the first time you must enter the following data:
YOUR AREA CODE
AT LEAST ONE CALLER ID PIN
PROGRAMMING YOUR AREA CODE:

At the "WAITING FOR CALL" display panel 40 press the (*) key followed by your four digit access code. The following message is displayed on display panel 40:

| * | SET TIME/DATE | PRESS 1 |
|---|---|---|
| # | TIME/DATE OK PRESS 2 | |

Pressing the three (3) key will put you in the "PROGRAMMING YOUR AREA CODE" mode and display the following message on display panel 40:
ENTER YOUR AREA CODE
IF CORRECT # RE-ENTER At this time you can enter your area code in a similar fashion to the way you set the clock in the previous section. Example—enter 903 press the (*) key to save your area code and return to the "WAITING FOR CALL" message on display panel 40.

PROGRAMMING A CALLER ID PASSWORD INTO THE SCREENING DEVICE 1

At the "WAITING FOR CALL" message on display panel 40 press the (*) key followed by your four digit access code. The following message is displayed on display panel 40:

| SET TIME/DATE | PRESS 1 |
|---|---|
| TIME/DATE OK | PRESS 2 |

At this time press the two (2) key on the keypad. The following message is displayed on display panel 40 (or press the "UP ARROW" key to exit.)

* ENTER NEW NUMBER
DELETE EXISTING NUMBER

At this time press the (*) key on the keypad. The following message is displayed on display panel 40: (or press the "UP ARROW" key to exit.)

---
ENTER NAME
* IF CORRECT                RE-ENTER
---

You can now enter a persons name that will be assigned to the new caller ID password. The name is entered one character at a time using 2 numbers to represent each character. If you look at the numbers on the key-pad you will see three letters above each number except for the numbers one and zero. Each of these number can generate 3 letters when used in conjunction with the numbers one, two and three. To display the letter "A" you would press the two then the one key on the keyboard. The two key tells screening device 1 you want to display one of three possible letters (A, B, or C) and the one key selects the letter A which is the first letter on that key. The letters Z and Q do not appear on the keys. They can be programmed as follows: to program the Q press the 7 and 4 keys. To program the Z press the 9 and 4 keys. A space can also be displayed by pressing the zero key twice. If you make a mistake entering the name press the (#) key on the key-board and re-enter the name. Once the correct name is displayed on the display panel 40 you can continue to the next step by pressing (*) key. The following message is displayed:

---
ENTER AREA CODE + PHONE #
* IF CORRECT    # RE-ENTER
---

The area code and phone number that will be assigned to the new caller ID password can be programmed by entering 10 consecutive numbers starting with the three digit area code and then the seven digit phone number. Press the (*) key when complete and the following message will be displayed:

---
ENTER RING CODE:
* IF CORRECT # RE-ENTER
---

You now need to tell screening device 1 how to ring the phone for this caller. The possible choices for this are as follows:

| | | |
|---|---|---|
| ZERO | (0) | NO RING DIRECTORY ONLY (USE DIRECTORY FOR AUTOOUTGOING CALL) |
| ONE | (1) | NORMAL PHONE RING |
| TWO | (2) | TWO SHORT RINGS AND ONE LONG PAUSE PER CYCLE |
| THREE | (3) | ONE SHORT RING ONE, LONG RING AND 1 SHORT PAUSE PER CYCLE |
| FOUR | (4) | YOUR PASSWORD IF YOU ARE CALLING ANOTHER DEVICE |
| FIVE | (5) | VISUAL INDICATOR FOR HEARING IMPAIRED INDIVIDUALS |
| SIX | (6) | THROUGH SEVEN (7) FOR FUTURE USE |
| EIGHT | (8) | NORMAL RING + NOTIFICATION TO PAGER NUMBER 1 |
| NINE | (9) | NORMAL RING + NOTIFICATION TO PAGER NUMBER |

Press the (*) key when complete and the following message will be displayed:
ENTER ALTERNATE PASSWORD
* IF CORRECT #RE-ENTER You can now enter an "ALTERNATE PASSWORD" for this user. Normally screening device 1 uses the last four digits of the phone number entered as the CALLER ID PASSWORD. You now have the option to assign an alternate four digit password to the caller. If you press the asterisk (*) key screening device 1 will assume the password is the last four digits of the phone number. If you enter a four digit alternate password it must be entered by the calling party to ring your phone. This ID number will not be displayed as an incoming call display panel 40. The caller's phone number will appear on display panel 40. The alternate password will not be displayed on this display or any other display. The alternate password is hidden in screening device 1. The "ALTERNATE PASSWORD" could be used by family members preventing a non authorized person from looking in the phone book for your last four digits of your phone number.

You now have the choice of entering a second caller ID password, deleting a existing caller ID password, or returning to the "WAITING FOR CALL" display panel 40 by pressing the "UP ARROW" key on the keyboard.

CALL BLOCKING BY AREA CODE

At the waiting for call screen enter your password. Now press the 7 key on the keypad. The following screen is displayed:

---
ENTER AREA CODE
* IF CORRECT                # RE-ENTER
---

Now enter the area code you wish to block. When the correct area code is on the screen press Star (*) Key 30. You can now enter additional area codes or press the scroll up arrow key on the keypad to exit back to the waiting for call screen.

CALL BLOCKING BY PHONE NUMBERS AND TIME

At the waiting for call screen press (DIR) Key 35 to display the first user on your directory list. Scroll through the list until the phone number and name you wish to block is displayed on the screen. Now enter your password on the keypad. The following screen is displayed:
ENTER NEW RING+TIME CODE
* IF CORRECT # RE-ENTER Now press the number on the keypad representing the time code for this user. Now press the number on the keypad representing the ring code for this user. To use previous ring code press Star (*) Key 30.

AVAILABLE TIME CODES

0—always ring phone
1—8:30 p.m. to 9:00 a.m.

2—9:00 p.m. to 9:00 a.m.
3—9:30 p.m. to 9:30 a.m.
4—10:00 p.m. to 9:00 a.m.—BLOCKS ALL INCOMING AND OUTGOING
5—10:30 p.m. to 8:00 a.m. CALLS DURING THESE TIMES
6—11:00 p.m. to 7:00 a.m.
7—12:00 p.m. to 7:00 a.m.
8—12:00 a.m. to 6:00 a.m.
9—block 24 hours EXAMPLE: 4* Time code 4 and same ring code as previously programmed.

Telephone 3 will not allow outgoing or incoming calls between 10:00 p.m. to 9:00 a.m.

EXAMPLE: 21 Time code 2 ring code 1

Telephone 3 will not allow incoming and outgoing calls between 9:00 p.m. to 9:00 a.m.

DELETING AN EXISTING NUMBER

At the main display panel 40 press the (*) key followed by your 4 digit access code. Now press the (2) on the key-pad. Now press the # key on the key-pad. Screening device 1 now prompts you for the phone number you wish to delete. When the correct phone number is displayed on the display panel 40 press the (*) key on the key pad. Screening device 1 now prompts you with the name assigned to that phone number. You now have the choice of deleting that caller by pressing the (*) key, re-entering a number to be deleted by pressing the # key, or returning to the waiting for call display panel 40 by pressing the (UP-ARROW) key.

PROGRAMMING THE PAGER NOTIFICATION FEATURE

Screening device 1 is capable of paging one of two pagers for each Caller ID number assigned. Upon receiving a call from a user with a ring code of 8 or 9 the system will automatically enter into pager notification mode. If the phone is answered the callers information will be stored in a list of recent calls and the pager notification system will deactivate. When the call goes unanswered or the caller hangs up his phone the pager notification system activates and dials a pager number (pager 1 for ring code 8 and pager 2 for ring code 9). After a programmed delay the system then dials a programmed pager pin number (if necessary) followed by the callers phone number.

Before using the PAGER NOTIFICATION FEATURE your pager number and pin must be entered.

At the "WAITING FOR CALL SCREEN" press the (*) key and your four digit access code. To program pager one press the eight (8) key or press the nine (9) key to program pager two. The following display panel 40 is displayed:
ENTER AREA CODE+PHONE #
IF CORRECT # RE-ENTER At this point enter your pager area code and phone number. When the correct phone number is on the display panel 40 press (*) key. The following display panel 40 is displayed:
ENTER PIN # (* IF N/A)
* IF CORRECT # RE-ENTER Now enter your pagers pin number (if required). When the correct pin number is on the display panel 40 press the (*) key (press the (*) key if your pager does not use a pin number). The following display panel 40 is displayed:
ENTER DELAY:
* IF CORRECT # RE-ENTER You must enter a delay time for the pager notification system. This delay corresponds to the time it takes your pager company to answer your call until they are ready to receive pager data. A good starting point for this is a delay of (5) five seconds. Press the (5) key.

AUTO RE-DIAL FEATURE

If the called party is busy hang up the phone and press *56 on screening device 1. Screening device 1 will re-dial the number for 30 minutes or until it becomes available, when available it rings the called party and your phone.

Auto re-dial is automatically deactivated when the phone is picked up (off hook) or an incoming call is detected.

Before using the auto re-dial feature a valid outgoing password must be entered. This is to maintain compatibility if your SCREENING DEVICE 1 connects with another SCREENING DEVICE 1a when using this feature.

The outgoing password is programmed just like any other "CALLER ID PASSWORD" except a ring code of (4) four must be entered. When entering the outgoing password keep in mind the last four digits of the phone number you enter will be used as your password when connecting to another SCREENING DEVICE 1. The first 3 numbers of the phone number can be any number since they are not recognized by screening device 1. The name entered for the outgoing password is also not recognized. It may be good practice to use the name "MY PASSWORD".

Alternative embodiments and additional features are depicted in FIG. 5.

In addition to the embodiments described herein many alternative embodiments and modifications will be readily apparent to those skilled in the art, and this application is intended to cover any such adaptations or variations thereof. For example the caller ID passwords and other passwords can be more or less than four digits and more or less than 128 passwords are contemplated. It is intended that this invention be limited only by the claims and equivalents thereof.

It is also contemplated by this invention that the user can temporarily disable the screening features for either indefinite or predetermined periods to permit call backs to ring through.

The use of a built-in answering device and static memory which does not require power to retain it's content are also contemplated.

It is further contemplated that the within invention can accommodate alternatives to 911 calls and disable screening to permit calls to ring through, such as non-emergency three or more digit out going calls.

We claim:
1. An improved screening device comprising
an input port for connecting to a telephone grid;
an output port for connecting to a telephone set;
a display panel;
a memory circuit;
a processing circuit connected to the input port, to the output port, to the display panel, and to the memory circuit, wherein the processing circuit screens incoming telephone calls upon being set to do so and wherein the processing circuit deactivates screening of incoming telephone calls based upon a corresponding setting followed by an activation of the setting;

wherein an emergency number is set in the processing circuit, wherein a telephone call called by a user of the telephone set made to the emergency number causes the processing circuit to deactivate the screening of connections to incoming telephone calls by activation of the setting.

2. The improved screening device according to claim 1 wherein the processing circuit further comprises a programmable caller identifier for screening one or more telephone lines.

3. The improved screening device as described in claim 1 further comprising non-volatile memory for storing caller identification codes.

4. The improved screening device as described in claim 1 further comprising a user activated automatic dialer.

5. The improved screening device as described in claim 1 further comprising an integral answering device.

6. The improved screening device as described in claim 1 further comprising one or more caller information display devices.

7. The improved screening device as described in claim 1 further comprising one or more visual ringing devices.

8. The improved screening device as described in claim 1 further comprising an integral communication port to connect to a separate computing device.

9. The improved screening device according to claim 1 for being installed in a computing device which is comprised of a programmable caller identifier 911 for screening one or more telephone lines.

10. The improved screening device according to claim 1, wherein the processing circuit accesses a database disposed in the memory circuit;

wherein a caller identifier number is associated with a certain telephone caller;

wherein the certain caller is associated with information disposed in the database upon incoming of the caller identifier number through the input port.

11. The improved screening device according to claim 1, wherein the processing circuit accesses a database disposed in the memory circuit;

wherein a caller identifier number is associated with a certain telephone caller;

wherein the certain caller is enabled to ring through to the recipient upon an incoming of the caller identifier number through the input port.

12. The improved screening device according to claim 1, further comprising a keyboard connected to the processing circuit.

13. An improved screening device comprising an input port for connecting to a telephone grid;

an output port for connecting to a telephone set;

a display panel;

a memory circuit;

a processing circuit connected to the input port, to the output port, to the display panel, and to the memory circuit, wherein the processing circuit screens incoming telephone calls upon being set to do so and wherein the processing circuit deactivates screening of incoming telephone calls based upon a corresponding setting followed by an activation of the setting;

wherein an emergency number is set in the processing circuit, wherein a telephone call called by a user of the telephone set made to the emergency number causes the processing unit to deactivate the screening of connections to incoming telephone calls by activation of the setting;

and wherein the processing circuit then permits unrestricted callbacks after the placement of the emergency call by the user.

14. The improved screening device as described in claim 13 further comprising a user activated automatic dialer.

15. The improved screening device as described in claim 13 further comprising an integral voice messaging device.

16. The improved screening device as described in claim 13 which is further comprised of one or more visual ringing devices.

17. The improved screening device as described in any of claims 2–8 or 9–16 which is further comprised of programmable additional features including variable ring selection, auto dial retry, call forwarding, call blocking, off site call back, pager notification, call audit, temporary caller identification(ID) and re-enter of identification codes.

18. The improved screening device as described in any of claims 2–8 or 9–16 which is further comprised of a removable programmable central processing unit (CPU) to provide for additional features.

19. The improved screening device according to claim 13, further comprising a keyboard connected to the processing circuit.

20. An improved screening device comprising an input port for connecting to a telephone grid;

an output port for connecting to a telephone set;

a display panel;

a memory circuit;

a processing circuit connected to the input port, to the output port, to the display panel, and to the memory circuit, wherein the processing circuit screens incoming telephone calls upon being set to do so and wherein the processing circuit deactivates screening of incoming telephone calls based upon a corresponding setting followed by an activation of the setting;

wherein an emergency number is set in the processing circuit, wherein a telephone call called by a user of the telephone set made to the emergency number causes the processing unit to deactivate the screening of connections to incoming telephone calls by activation of the setting;

and wherein the processing circuit permits any recipient of the telephone call to the emergency number to call back without having to match numbers in any way with any listing of a police telephone number, a fire department telephone number, or an emergency telephone number disposed in the memory circuit.

21. An improved screening device comprising an input port for connecting to a telephone grid;

an output port for connecting to a telephone set;

a display panel;

a memory circuit;

a processing circuit connected to the input port, to the output port, to the display panel, and to the memory circuit, wherein the processing circuit screens incoming telephone calls upon being set to do so and wherein the processing circuit deactivates screening of incoming telephone calls based upon a corresponding setting followed by an activation of the setting;

wherein an emergency number is set in the processing circuit, wherein a telephone call called by a user of the telephone set made to the emergency number causes the processing unit to deactivate the screening of connections to incoming telephone calls by activation of the setting;

and wherein the processing circuit permits any recipient of the telephone call to the emergency number to call back without having to bypass in any way a screening function of the processing circuit.

* * * * *